United States Patent
Nussbaum et al.

[11] Patent Number: 5,086,213
[45] Date of Patent: Feb. 4, 1992

[54] DEVICE FOR DETECTING, DURING WELDING, VARIATION IN THE PHYSICAL STATE OF THE PLASTIC MATERIAL IN A COUPLING PIECE OF JOINING PIPES

[75] Inventors: Max Nussbaum, Eaubonne; Eric Federspiel, Saint Gratien, both of France

[73] Assignee: Gaz de France, Paris, France

[21] Appl. No.: 450,944

[22] Filed: Dec. 15, 1989

[30] Foreign Application Priority Data

Dec. 29, 1988 [FR] France ............... 88 17420

[51] Int. Cl.⁵ .................. H05B 3/48; H05B 3/58
[52] U.S. Cl. .................. 219/535; 156/274.2; 156/304.3; 156/379.7; 219/496; 219/541
[58] Field of Search ........... 156/158, 273.9, 274.2, 156/304.3, 379.7; 219/496, 535, 541, 544

[56] References Cited

U.S. PATENT DOCUMENTS

| | | | |
|---|---|---|---|
| 4,684,417 | 8/1987 | Grandclement | 219/535 |
| 4,703,150 | 10/1987 | Kunnecke et al. | 219/535 |
| 4,727,242 | 2/1988 | Barfield | 219/544 |

FOREIGN PATENT DOCUMENTS

| | | |
|---|---|---|
| 149410 | 12/1985 | European Pat. Off. |
| 173174 | 3/1986 | European Pat. Off. |
| 221396 | 5/1987 | European Pat. Off. |
| 257283 | 3/1988 | European Pat. Off. |

*Primary Examiner*—Michael G. Wityshyn
*Attorney, Agent, or Firm*—Pollock, VandeSande & Priddy

[57] ABSTRACT

The invention concerns a device for detecting variations in the physical state of the plastic material in a coupling piece used for welding pipes and incorporating a heating resistor, cavities which the softened material can enter and sensors for detecting the state of the material within the cavities. According to the invention, in order to obtain a weld of high quality, it is necessary for the distance between the bottom of the cavities and the part of the resistor nearest this bottom on the one hand, and for the linear dimension in the cross-section of these same cavities near their bottom on the other, to be less than or equal to the thickness of the material which is softened during the heating of the pieces. The invention applies to the control of the welding of sections of piping, particularly for the gas industry.

9 Claims, 2 Drawing Sheets

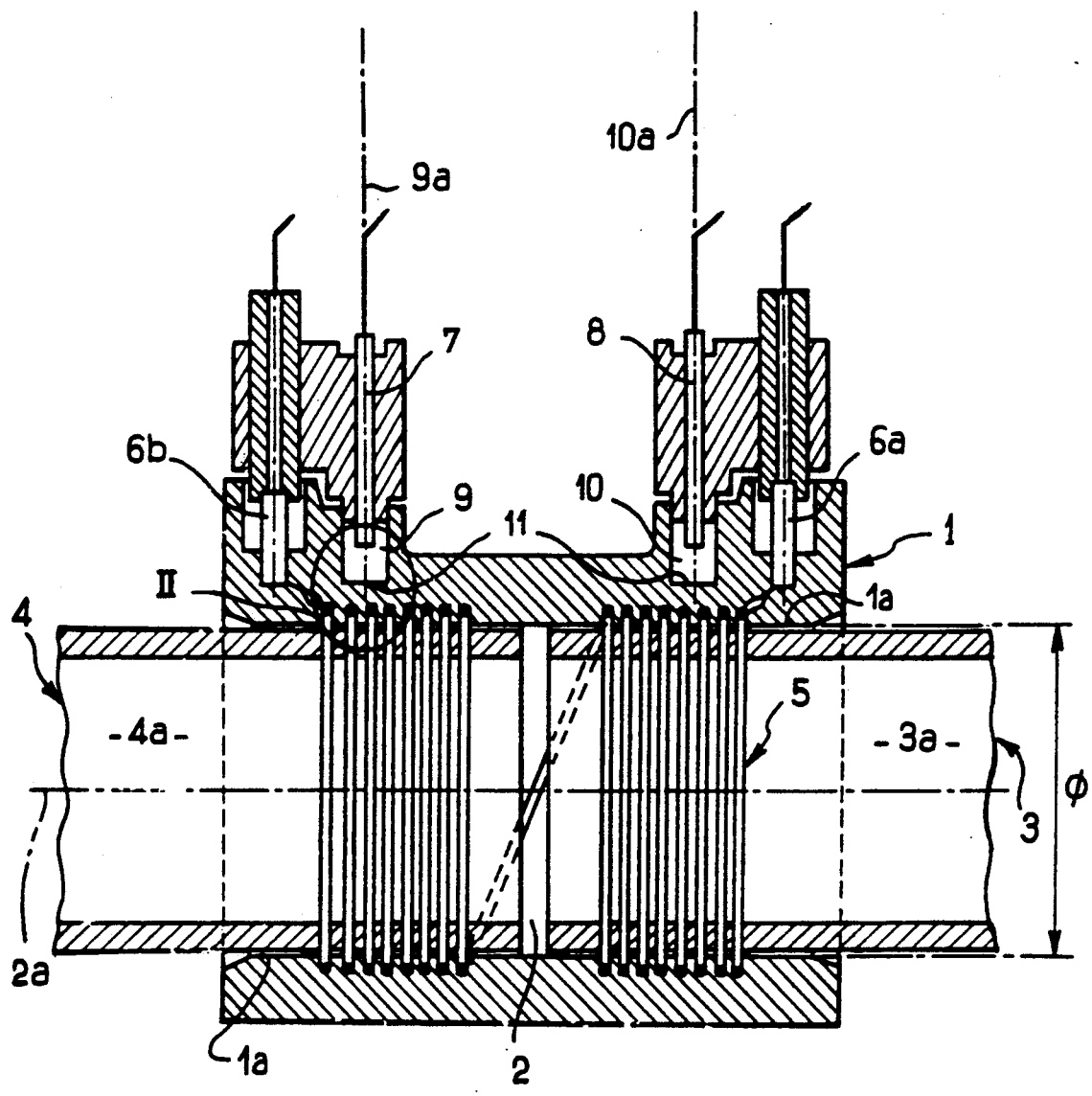
FIG_1

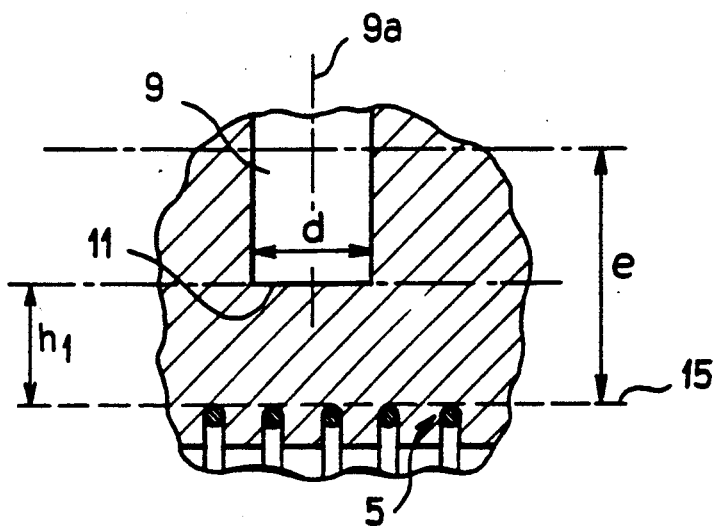
FIG_2
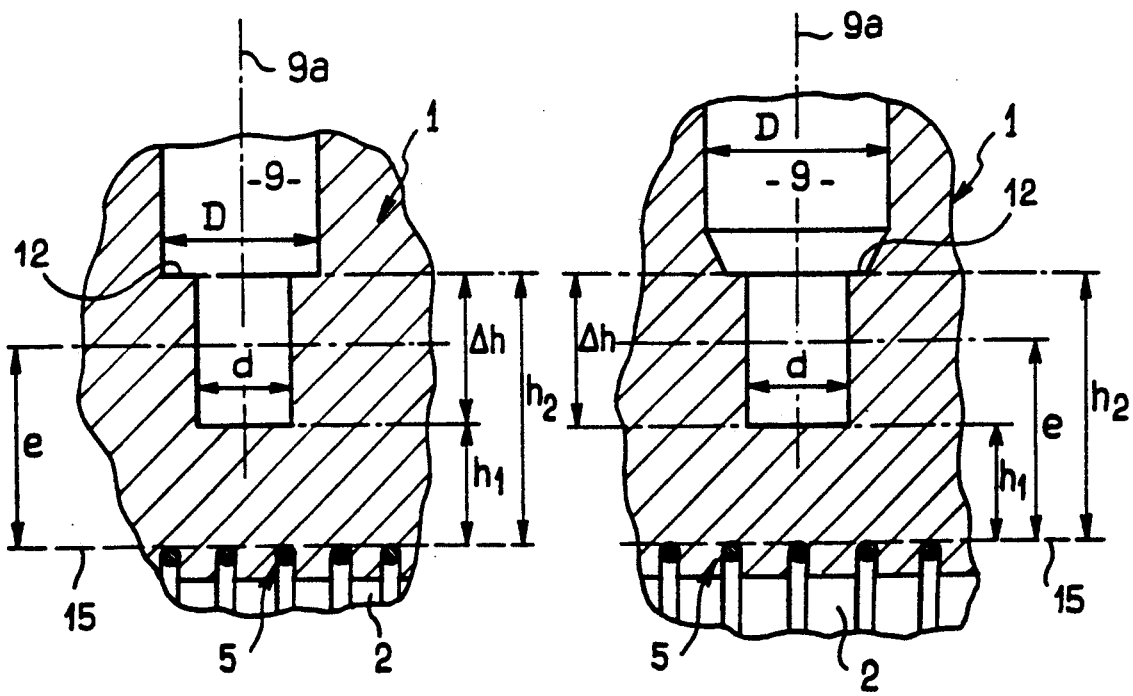
FIG_3  FIG_4

DEVICE FOR DETECTING, DURING WELDING, VARIATION IN THE PHYSICAL STATE OF THE PLASTIC MATERIAL IN A COUPLING PIECE OF JOINING PIPES

BACKGROUND OF THE INVENTION

The subject of the invention is a device for the detection of variations, in the physical state during heating of the fusion-weldable plastic material in a coupling piece which is to be welded to another piece of the same material in the shape of a pipe with a circular or substantially circular cross-section.

Pipes made of plastic, especially of polyethylene, are being used more and more frequently for many purposes, particularly in gas distribution systems.

In practice, it is impossible to join such pipes to each other satisfactorily by gluing them together, so that welding, or more precisely fusion welding, is used for this purpose.

To achieve this, a coupling piece is used which mainly consists of a sleeve for joining together one of the ends of two pipes or alternatively, for example, of a locally saddle-shaped branching joint capable of the transverse coupling of the pipes. Whatever coupling piece is chosen, it usually incorporates an electrical heating resistor embedded in the material of which it is made and located near the surface that will come into contact with the surface of the pipe. The welding operation is carried out by connecting the resistor to a source of electricity (such as a rectified alternating current) which will cause Joule heating of the resistor and produce softening and melting of the surrounding plastic material, thus achieving the welding.

Although this method of connection is attractive, it does present the difficulty, of controlling the time for which the resistor needs to be heated in order to obtain a high quality weld and thus to form the pipe or pipes and the coupling piece into a solid block.

At present, it is known that such control can be satisfactorily achieved by monitoring two physical quantities: the temperature and the volume of the material of the pieces to be welded.

To achieve active monitoring of these quantities, it has been proposed that, in one of the pieces to be assembled, at least one cavity should be formed, into which the softened material penetrates. Such a cavity extends along an axis substantially radial with respect to the pipe or pipes until it is near a part of the resistor, where it ends in a bottom wall. With this cavity is associated a sensor capable of detecting variations in the physical state of the material within the cavity, the sensor being itself connected to means for commanding switching off of the electrical power supply to the heating resistor.

Various types of sensors have already been considered elsewhere, such as for example a thermal probe, a microswitch sensitive to the pressure of the softened material within the cavity, or else a sensor sensitive to the hardness or consistency of this same material.

Such sensors, and others, are mainly described in the French patent application FR-A-2,555,936 and in its certificates of addition FR-A-2,572,327 and FR-A-2,600,008.

However, in spite of all these improvements, certain problems still remain and the quality of the welding of the pieces is not always satisfactory.

In particular, various tests have shown that, for reduced coupling clearances between the pieces, the welding time has a tendency to decrease while the clearances increase, which, as can be appreciated, seriously degrades the quality of the weld.

In fact, the coupling clearances may in practice vary considerably, depending on the pieces being used.

Moreover, it is impossible with present-day welding techniques to obtain, under good conditions, a situation in which the thickness of the material melted during the heating increases with the size of the pieces to be assembled, which is in practice necessary.

The aim of the invention is to solve these various problems by defining conditions for the shape, size and position of the cavities into which the softened material penetrates during the heating and within which the sensors are located for recording the variations in its physical state.

SUMMARY OF THE INVENTION

According to a first characteristic of the invention, the distance between the bottom wall of the cavity and the part of the resistor which is nearest to it, and the linear dimension in cross-section in a plane substantially perpendicular to the axis of this same cavity near its bottom wall must both be less than or equal to the thickness of the material which becomes soft during the heating of the pieces.

In this way, it will be possible to ensure that the softening and melting of the bottom of the cavity occurs before the pressure of the material melted by the resistor is enough to "break through it", while preventing a premature entry of the melted material into the cavity which causes the sensor to command the switching off of the electrical power supply to the resistor before the cohesion of the pieces at the welding interface is sufficient to ensure a high quality weld after cooling.

It should be pointed out here that the expression "part of the resistor nearest the bottom wall of the cavity" must be interpreted as defining that section of the resistor which is located nearest the bottom wall of this cavity and substantially opposite it.

According to another characteristic of the invention, the cavity in question will become wider above its bottom wall by locally forming a shoulder such that the distance which separates this shoulder from the part of the resistor nearest the bottom wall is less than or equal to twice the thickness of the material forming the piece in which the cavity is formed and which is softened during heating.

In this way, it will be possible to fit most of the currently existing sensors into the cavity in their optimum locations, thus enabling the heating time to be subject to an absolutely strict control.

Even though the invention may be applied in such a way as to ensure that the different types of coupling and different types of piping can be assembled, it nevertheless remains that, in practice, a large number of operations consist in the welding of two pipes placed end to end with one end of each of them pushed into a coupling sleeve having an aperture of circular cross-section for the reception of the pipes.

The conditions for implementation according to the invention are then as follows:

$$0 < d \leq (0.03 \times \phi) + 8 \text{ and}$$

$$0 < h_1 \leq (0.03 \times \phi) + 8$$

where d is the diameter in mm of the said cavity near its bottom wall, $h_1$ is the distance in mm between the bottom wall of this same cavity and the nearest part of the heating resistor, and $\phi$ is the diameter in mm of the sleeve aperture.

The characteristics and advantages of the invention will emerge more clearly from the description which follows, made with reference to the appended drawings.

DESCRIPTION OF THE FIGURES

FIG. 1 is a longitudinal cross-section of two coaxial pipes ready to be joined together by means of an electrically weldable coupling sleeve, FIG. 2 is an enlarged view of the detail labelled II in FIG. 1, and FIGS. 3 and 4 are two possible variants of the realization of the cavity illustrated in FIG. 2.

DESCRIPTION OF THE PREFERRED EMBODIMENT

Referring first of all to FIG. 1, the illustration is of a coupling piece made of a thermofusible plastic material such as polyethylene, this piece forming a sleeve, into the aperture 2 of which are introduced the ends 3a, 4a respectively of two identical cylindrical circular pipes 3, 4 also made of thermofusible plastic material. The pipes 3 and 4 are arranged coaxially, substantially having the same axis 2a as that of the sleeve aperture, and they have an outer diameter slightly less than the diameter $\phi$ of the aperture 2, so that the sleeve and the pipes have corresponding surfaces facing each other by which they can be mutually connected during the welding.

In order to join the pipes together, the sleeve 1 incorporates an electrical heating resistor 5 embedded in the body of the material in the immediate neighborhood of its lower surface labelled 1a.

The resistor 5 is connected through its terminals 6a, 6b to a source of electric power (not shown) capable of producing a rise in the temperature of the resistor large enough to cause the pieces to be welded together.

In the case in point, the resistor 5 consists of a cylindrical electric winding with a circular cross-section whose axis is parallel to that of the sleeve and which is connected to the abovementioned electrical power supply.

It would, however, also be possible to envisage embedding in the body of the sleeve a layer of material with electrical conductivity and heating qualities comparable with those of the winding.

In order to control the welding, the coupling sleeve 1 is also fitted with two sensors 7, 8 located in the cavities 9, 10 each directed along an axis 9a, 10a oriented substantially radially with respect to the axis 2a of the pipes, these cavities extending to a region in the neighborhood of the nearest part of the opposite winding, ending at this same level in a bottom wall 11, which can be more clearly distinguished in FIGS. 2 to 4 (where the cavities are shown without sensors for clarity).

The sensors 7, 8, known per se, may consist for example of microswitches.

In known devices of this type, the process of welding the pieces together is normally such that, once the resistor has been sufficiently heated, the surrounding plastic begins to melt and expand. The pressure from this expansion causes softened material to enter the bottom of the cavities 9 and 10 and then, with the expansion continuing, causes the material to rise in the cavities until it activates the sensors 7 and 8 in such a way as to tend to switch off the supply of electrical power to the heating resistor, thus interrupting the heating of the pieces, which are then allowed to cool.

The drawback to such a process is that the entry of the softened or melted material into the bottom of the cavity is caused by the pressure due to the expansion of the material, which runs the risk of leading to too rapid an activation of the sensors and thus to too short a period of heating the pieces. Various experimental measurements have in fact indicated that, for relatively small clearances between the inner diameter of the sleeve (aperture 2) and the outer diameter of the pipes 3, 4, the heating time for the pieces was insufficient, with the pressure from the expansion of the material creating too rapid a rise of the material towards the sensors.

To overcome this drawback, the invention thus plans in the first place to locate the bottom wall 11 of the cavities at such a distance from the nearest part of the heating resistor that the bottom wall 11 in question is melted by the heating effect before the pressure due to the expansion is enough to push the melted material into the cavities.

To achieve this, it is necessary for $h_1$ to be less than or equal to e where:

$h_1$ is the mean distance between the bottom wall 11 of each cavity and the general plane 15 tangential to the winding and containing the part of the resistor nearest to the bottom, and e is the thickness of the plastic forming the sleeve 1 which melts during the heating of the pieces.

In the case in point, in FIGS. 2 to 4, this thickness e is the thickness of the material located, with respect to the axis of the sleeve, further away than, or outside, the plane 15.

In addition, to prevent too rapid a flow of the softened material into the cavity causing, in spite of everything, a premature stoppage of the heating, the invention also provides for control of the speed of flow of the material by a strict shaping of the cavities in such a way that the linear dimension in their cross-section is, at least near their bottom surface and in a plane substantially perpendicular to their axes (such as 9a in FIG. 2), less than or equal to the abovementioned thickness of the softened material.

In this way, it will be possible to ensure, whatever the coupling clearance between the assembled pieces, not only the melting of the bottom wall 11 of the cavities before the pressure of the softened material is enough to break through it, but also a control of the speed of flow of this same material permitting an activation of the sensors 7 and 8 only after a period of heating of the resistor 5 sufficient to guarantee a high quality weld after cooling.

At present, the majority of existing sensors 7, 8, if not all of them, are installed inside cavities.

It might therefore be useful in some cases, depending on the size of the sensors being used, to have available cavities providing a relatively large interior volume to contain them.

As a result, the possibility has been provided, as illustrated in FIGS. 3 and 4, of shaping the cavities in such a way that they become wider as the distance from their bottom wall 11 increases, by the local introduction of a peripheral shoulder 12.

In practice, this abrupt widening of the cross-section will be located at a distance $h_2$ from the general plane 15 defined above such that $h_2 \leq 2e$ (e still being the abovementioned thickness of melted material).

In this way, a neck of height $\Delta h = h_2 - h_1$ will be available, enough to provide an effective control of the rise of the material in each cavity, with the necks in question of course satisfying the abovementioned conditions as regards the linear dimension in their cross-sections. On the other hand, their transverse cross-section may vary in shape.

FIG. 3, for example, illustrates a cavity having the form of two cylinders placed end to end and having circular cross-sections with successive diameters, moving away from the bottom wall 11, first of d and then of D, with $D > d$.

In this case, assuming also that the sleeve being used has an aperture 2 of circular cross-section with diameter $\phi$, the dimensional conditions to be satisfied in order to obtain a heating time for the pieces which will ensure a high quality weld will be:

$$0 < d \leq (0.03 \times \phi) + 8$$

$$0 < h_1 \leq (0.03 \times \phi) + 8 \text{ and}$$

$$0.01 \times \phi + 0.7 \leq h_2 \leq (0.06 \times \phi) + 2.8$$

d, $h_1$ and $\phi$ being expressed in mm.

If, in addition, we wish to introduce as a parameter the thickness e defined above by taking into account the results of experiments that have been carried out, the conditions to be satisfied simultaneously by the dimensions will then become, as regards the coupling piece used:

$$0 < d$$

$$0.83e - 2 \leq d \leq 0.83e$$

$$1.14e - 1 \leq h_2 \leq 1.14e + 1.5$$

$$0 \leq h_2$$

$$0.7e - 1 \leq h_1 \leq 0.7e + 0.5$$

$$0 \leq h_1$$

(d, $h_2$, $h_1$ and e still being expressed in mm).

Of course, if the cavity did not have a shoulder, the condition involving h: would not arise (cf. FIG. 2, in which there is a cylindrical cavity 9 with constant circular cross-section).

FIG. 4 shows another variant of the embodiment in which the cavity is in the form of two cylinders of circular cross-section with respective diameters d and D linked by a truncated cone whose smaller base is situated at a distance $h_2$ from the plane 15 of the resistor 5.

It is obvious that many other shapes could be envisaged for the cavities, provided that the abovementioned dimensional conditions are satisfied, with the number of cavities and sensors depending on the chosen application.

In the same way, the invention can be applied to coupling pieces other than sleeves, such as for example locally saddle-shaped branching joints overlapping the outer surface of a pipe for its connection to another pipe arranged transversely.

To make the description clearer, two examples are presented below of tests which were carried out with a view to welding a pipe and a sleeve incorporating a cavity of the type illustrated in FIG. 3 and an electric winding for heating the pieces.

|  | Units | Example 1 | Example 2 |
|---|---|---|---|
| Mean diameter of sleeve aperture ($\phi$) | mm | 111.0 | 169.7 |
| Diameter of wire forming the winding | mm | 1.20 | 1.30 |
| Winding material |  | Cu Ni 6 | Cu Ni 6 |
| Electrical resistivity of winding (23° C.) | $\Omega$m | $9.9 \times 10^{-8}$ | $9.9 \times 10^{-8}$ |
| Temp. coefficient (1) of winding ($\alpha$) | $K^{-1}$ | $700 \times 10^{-6}$ | $70 \times 10^{-6}$ |
| Number of turns |  | 14.75 | 11.75 |
| Pitch of winding | mm | 3.8 | 5.25 |
| Thickness of plastic between winding and welding interface (1a) | mm | 0.55 | 0.75 |
| Electrical resistance of winding (23° C.) | $\Omega$ | 1.0 | 1.02 |
| Heating voltage | V | 39 | 39 |
| Measured heating time | s | 200 | 350 |
| d | mm | 2.0 | 3.0 |
| $h_1$ | mm | 2.25 | 3.0 |
| $h_2$ | mm | 4.75 | 6.0 |
| Distance between the bottom of the cavity and the sensor | mm | 9.70 | 9.45 |
| e | mm | 3.9 | 4.975 |

(1) This coefficient reflects the variation in the resistivity of the winding as a function of temperature according to the relationship:

1) This coefficient reflects the variation in the resistivity of the winding as a function of temperature according to the relationship:

$$\rho = \rho_0(1 = \alpha(T - T_0))$$

where
$\rho$ is the resistivity at the temperature T
$\rho_0$ the resistivity at the reference temperature $T_0$ ($T_0 = 23°$ C.).

This coefficient depends directly on the type of resistor.

We claim:

1. A device for detecting changes in the physical state of a thermoplastic material forming a weld between piping pieces, comprising:
    an external thermoplastic coupling member including an aperture for receiving first and second lengths of internal piping pieces along a common axis, a cavity disposed in said coupling member extending along a radial dimension of said coupling member, said cavity having a bottom wall adjacent an inner surface of said coupling member, said bottom wall having an axial dimension d in the direction parallel to said common axis;
    an electrical heating resistor embedded in said thermoplastic coupling member between said cavity and an inner surface of said coupling member at a minimum radial depth $h_1$ from said bottom wall of said cavity, said heating resistor being connected to a source of electrical current for melting said thermoplastic material to a predetermined melted radial depth for welding said coupling member to said first and second pieces;
    said axial dimension d of said cavity and said depth $h_1$ each being selected to be less than or equal to the predetermined melted radial depth e measured from said resistor toward the external surface of said coupling member for melting the thermoplastic material surrounding the bottom of said cavity beyond the bottom wall thereof and filling said cavity with said melted material to a radial depth $e - h_1$, before an expansion pressure induced by the melting causes the melted material to expand into the cavity; and, sensor means disposed in said cavity for detecting when said melted material has expanded into said cavity beyond said predetermined melted depth and interrupting said electrical current in response to said detection.

2. The device according to claim 1 wherein said cavity has a shoulder spaced from the heating resistor a distance $h_2$ less than or equal to twice said portion e of said melted radial depth measured from said heating resistor toward the external surface of said coupling member.

3. The device according to claim 2 wherein the coupling member has an aperture with a circular cross-section having a diameter $\phi$, and the distance $h_2$ separating said shoulder from said heating resistor and diameter $\phi$ are related as:

$$0.01 \times \phi + 0.7 \leq h_2 \leq (0.06 \times \phi) + 2.8$$

4. The device according to claim 2 wherein the following relationships are satisfied:

$$0.83e - 2 \leq d < 0.83e$$

$$1.14e - 1 \leq h_2 < 1.14e + 1.5$$

$$0.7e - 1 \leq h_1 < 0.7e + 0.5$$

where d is the cavity dimension parallel to the common axis and e is the portion of the melted radial depth of material of the coupling member measured from said resistor toward the external surface of said coupling member.

5. The device of claim 1 wherein said coupling member aperture has a circular cross-section of diameter $\phi$, suitable for receiving one of said piping pieces, and said cavity has a substantially circular cross-section having the diameter d, which satisfies the relationships:

ti $0 < d \leq (0.03 \times \phi) + 8$ and $$0 < h_1 \leq (0.03 \times \phi) + 8$$

6. The device of claim 1 wherein said heating resistor is a helical winding embedded in the coupling member.

7. A device for monitoring the effective welding of a thermoplastic pipe to a thermoplastic coupling member comprising:

a heating resistor connected to a source of heating current, embedded within the coupling member near an inner surface of said coupling member which faces said thermoplastic pipe for heating to a welding temperature the surrounding material of said pipe and said coupling member; and, a sensor means, disposed within one end of a radially extending cavity in said coupling member for sensing the flowing of said melted material into said cavity, and interrupting said current when said melted material has expanded into said cavity a predetermined radial distance, said cavity having a second end at a radial distance $h_1$ from said heating resistor coupling member, said cavity having a linear dimension d in the axial direction of said coupling member, said distance $h_1$ and dimension d being less than the radial depth e of thermoplastic material of said coupling member which is melted during welding.

8. The device according to claim 7 wherein said coupling member has a circular cross-section having an inside diameter $\phi$, and said cavity includes a shoulder spaced a radial distance $h_2$ from said heating resistor which is greater or equal to twice the radial depth e of thermoplastic material of said coupling member which is melted during welding.

9. The device according to claim 8 wherein said cavity dimensions and distances are in accordance with the relationship:

$$0.01\phi + 0.7 \leq h_2 \leq 0.06 \times \phi + 2.8$$

* * * * *

UNITED STATES PATENT AND TRADEMARK OFFICE
CERTIFICATE OF CORRECTION

PATENT NO. : 5,086,213

DATED : February 4, 1992

INVENTOR(S) : Max Nussbaum, et al.

It is certified that error appears in the above-identified patent and that said Letters Patent is hereby corrected as shown below:

Column 5, line 43, "$0 \leq h_1$" should be --$0 < h_1$--.

Column 5, line 46, "h:" should be --$h_2$--.

Column 6, delete lines 26 and 27 in their entirety.

Column 6, line 31, "$1 = \alpha$" should be --$1 + \alpha$--.

Column 8, line 1, delete "ti".

Signed and Sealed this

Twelfth Day of October, 1993

Attest:

BRUCE LEHMAN

*Attesting Officer*          *Commissioner of Patents and Trademarks*